United States Patent [19]
Zumstein

[11] 3,834,258
[45] Sept. 10, 1974

[54] APPARATUS FOR THE SIMULTANEOUS MACHINING OF A MATERIAL MOVING WITH RELATIVE MOTION WITH RESPECT TO THE TOOLS, IN PARTICULAR FOR CUTTING UP A PLATE OF GLASS

[75] Inventor: Ernst Zumstein, Butzberg, Switzerland

[73] Assignee: Bystronic Maschinen AG, Butzberg, Switzerland

[22] Filed: Dec. 4, 1972

[21] Appl. No.: 312,034

[30] Foreign Application Priority Data
Dec. 7, 1971 Germany............................ 2160545

[52] U.S. Cl......................... 83/11, 83/71, 83/425.4, 83/433, 83/504, 83/508.3
[51] Int. Cl........ B26d 3/08, B26d 5/02, B26f 33/02
[58] Field of Search ............ 83/11, 425.2, 425.3, 71, 83/425.4, 425, 433, 499, 504, 508.3

[56] References Cited
UNITED STATES PATENTS
| | | | |
|---|---|---|---|
| 393,535 | 11/1888 | Browne................................. | 83/499 |
| 1,344,203 | 6/1920 | Hagmaier........................... | 83/508.3 |
| 2,694,420 | 11/1954 | Musser................................ | 83/425.4 |
| 3,470,776 | 10/1969 | Brichard et al. ......................... | 83/11 |
| 3,540,340 | 11/1970 | Koskela ................................ | 83/499 |
| 3,704,642 | 12/1972 | Dryon................................... | 83/11 |
| 3,742,793 | 7/1973 | Gray et al. ........................... | 83/11 X |

*Primary Examiner*—Frank T. Yost
*Attorney, Agent, or Firm*—Werner W. Kleeman

[57] ABSTRACT

Apparatus with several tools for the simultaneous machining of a material moving with relative motion with respect to the tools, said apparatus to be used in particular for cutting a glass plate to size and comprising a support table for supporting the material and a bridge extending over said table and carrying several tool carrier units displaceable in longitudinal direction by power drive. There is provided a drive means to drive a displacing means transversely to the direction of machining, the individual tool carrier units being connected through disengageable clutches with said displacing means at preset distances from one another.

14 Claims, 7 Drawing Figures

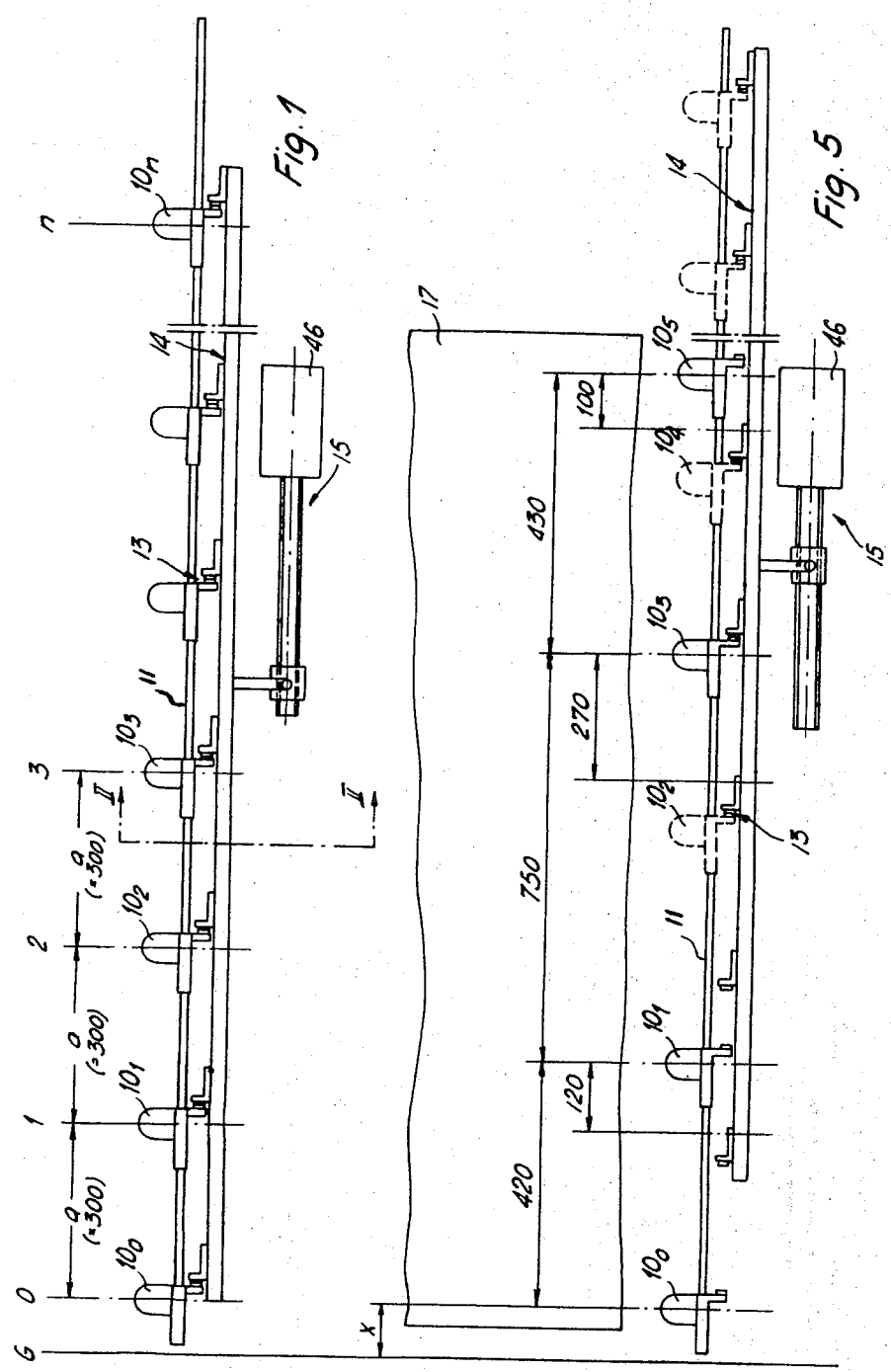

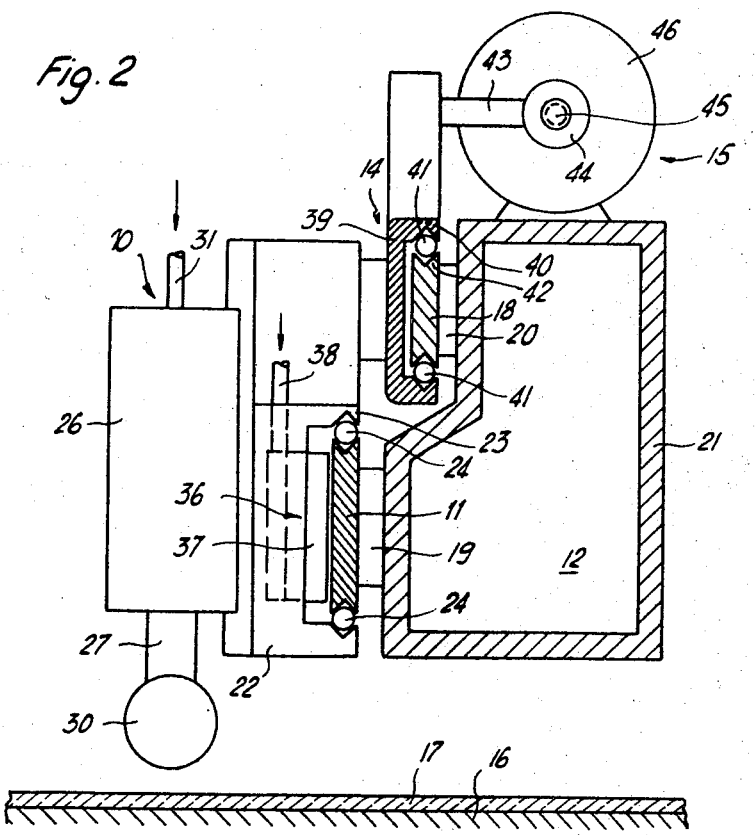
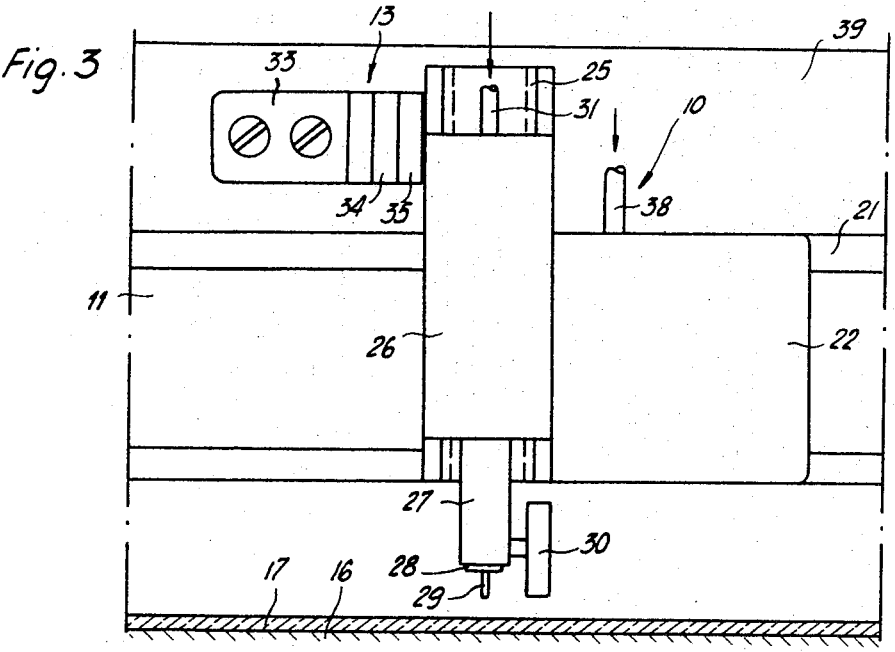

APPARATUS FOR THE SIMULTANEOUS MACHINING OF A MATERIAL MOVING WITH RELATIVE MOTION WITH RESPECT TO THE TOOLS, IN PARTICULAR FOR CUTTING UP A PLATE OF GLASS

The invention concerns an apparatus with several tools for the simultaneous machining of a material moving with relative motion with respect to the tools, in particular for cutting up a plate of glass.

The German Auslegeschrift No. 1,126,569 discloses an apparatus of the type mentioned for cutting glass plates to size. This apparatus comprises a bridge which looked at in cutting direction carries tool carrier units disposed at predetermined distances from one another, and being movable transversely to the cutting direction by way of individual lead shafts. The arrangement involving the lead shafts and the required transmission having several terminals and clutches, renders the cutting apparatus extremely complicated and expensive. From a functional point of view it is difficult to line up the tool carrying units in one line behind one another. The very long displacement distances required for each of the tool carrying units and the large masses of the component parts that need to be accelerated or decelerated are responsible for long set-up times, a relatively large wear, increased play and thereby inaccuracies in the set-up. Furthermore, due to the fact that the tool carrier units are lined up in the cutting direction behind one another, the number of applicable tool carrier units is limited. In addition, an automatic control device for setting the individual tool carrier units at desired cutting distances from one another turns out very complicated too, because each individual driven tool carrier unit is independent from the other and must be controlled individually.

The object of the invention is to improve on the above-mentioned apparatus in such a way, that the above-mentioned disadvantages are eliminated. According to the invention this object is achieved by a drive means provided for driving a displacing means transversely to the cutting direction, the individual tool carrier units being connected to said displacing means by way of disengageable clutches, at preset distances from one another.

The apparatus of the invention results not only in a considerable simplification and reduction of cost, but also in a faster operation and better accuracy.

By means of the arrangement by which the tool carrier units are disposed transversely to the cutting direction and at distances from one another, it is possible to keep the total displacement of the displacing means very small, so that it may practically correspond to the largest distance between two tool carrier units on the displacing means. In contrast to the known apparatus in which at least one of the tool carrier units must be transported from the basic or reference position to the most distant machining area, the present apparatus provides for the fact that by a relatively short displacement of a single displacing means the entire width of the material is scanned by means of tool carrier units, furthermore, that the individual tool carrier units may be positioned within a short time period in the desired machining location. Due to the fact that only one displacing means is required, to which the tool carrier units are connected or disconnected by way of clutches, the play too, which occurs in the apparatus of the invention is smaller than that occurring in the known apparatus. The clutches used for the connection and disconnection of the tool carrying units have less play, as is well know, than the lead shafts used in the known apparatus.

The simple arrangement of the tool carrier units as used in the present apparatus, also results in decreased masses to be accelerated and decelerated, the consequence thereof being a more rapid response and setting of the tool carrier units and a decrease in wear.

By virtue of a single drive means for all tool carrier units, it is not only the otherwise required drive motors or the voluminous distributing transmission which become superfluous, but valuable space becomes free, in which the tool carrier units can be displaced unimpeded. The bridge carrying the tool carrier units and the drive means become less weighty than in the case of the known apparatus and, therefore, may be dimensioned in a simpler and less costly fashion. By virtue of the forcible, common displacement of all tool carrier units, in the course of which only individual tool carrier units are separated from the displacing means by way of the disengageable clutches at the proper cutting distances, the automatic control device for the control of the cutting apparatus can be made simpler and thereby less costly, and subject to fewer disturbances.

It is not unconditionally necessary that in the reference position the tool carrier units be situated at equal distances from one another, however, such an arrangement simplifies the construction of the apparatus. If the distances between the tool carrier units are chosen to be equal, the control device in particular may be constructed more simply, since there are no differences in the basic distances between tool carrier units to be accounted for.

The apparatus is suited for the most varied kinds of machining processes and materials. Thus, it may be used for sizing, as for example by sawing, cutting or cutting by burning, of raw materials; in this case the direction of machining is transverse to the longitudinal extension of the material. The apparatus, however, is particularly suited for cutting material in the form of sheets or plates, as for example, paper, textile or plastic sheets, or wood, plastic and especially glass plates. For this purpose the apparatus must be provided with the proper tools to be mounted onto the tool carrier units.

In accordance with the requirement the apparatus according to the invention may be constructed in a great many different varieties, some of the advantageous ones being described in the description below, in particular with reference to the drawings.

FIG. 1 shows schematically a top view of the cutting apparatus for glass plates, FIG. 2 shows a tool carrier unit and displacing means mounted on a bridge, and shwon in section along the line II—II of FIG. 1;

FIG. 3 shows a front view of the arrangement of FIG. 2,

FIG. 5 shows a schematic view of the cutting apparatus of FIG. 1, showing the tool carrier units set to cutting distances;

Figure 4:
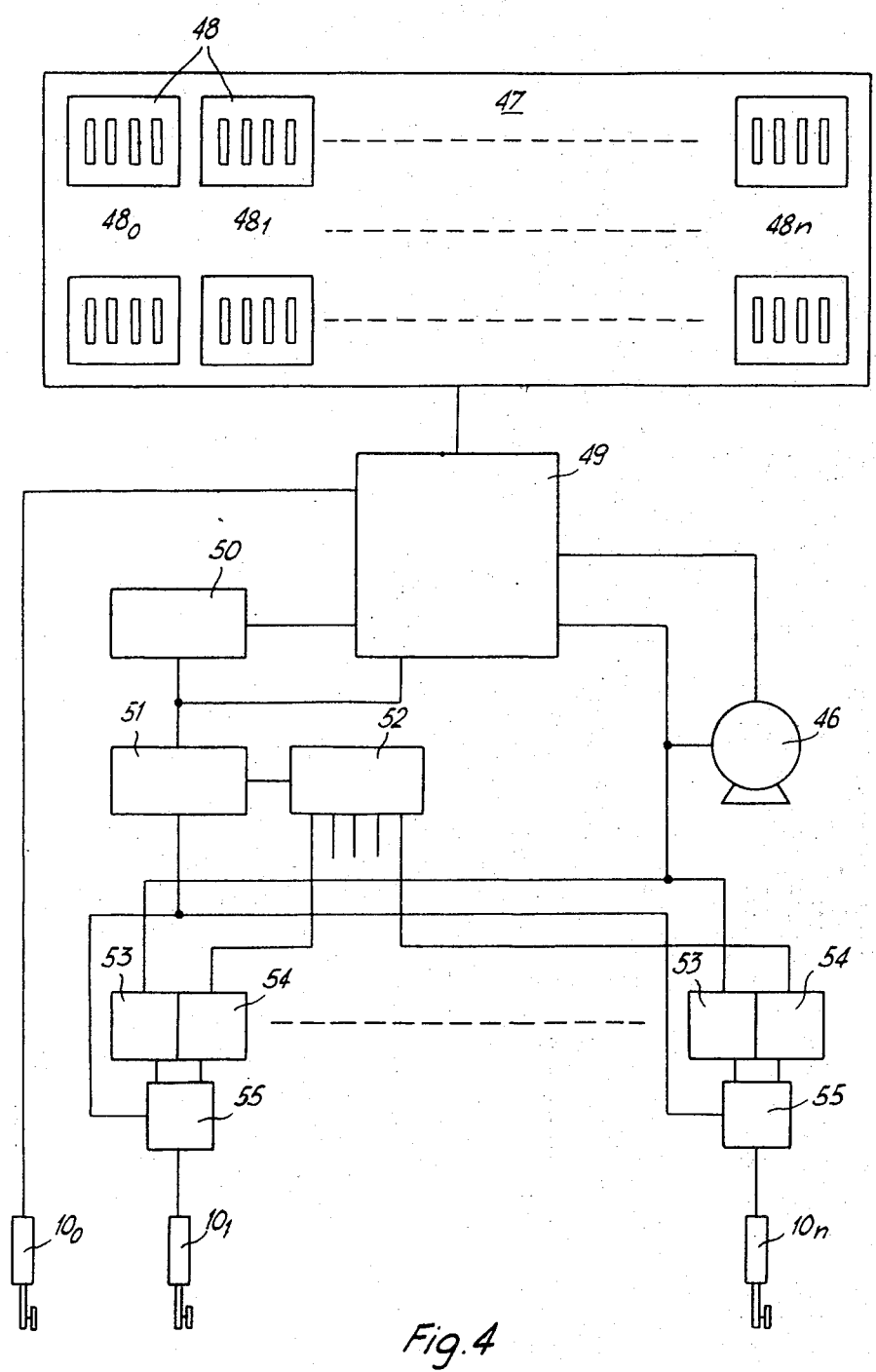
FIG. 4 shows a block diagram of an automatic control unit for the control of the cutting apparatus.

FIG. 1 shows a schematic view of a cutting apparatus for glass plates, with several tool carrier units 10, displaceably supported on a guide rail 11. The guide rail 11 is fixedly mounted on a bridge 12 omitted in FIG. 1 for the sake of simplicity, which, however, is shown in FIG. 2 and 3. The individual tool carrier units 10 are connected with a displacing or displacement means 14 by way of clutches 13, which displacing means is reciprocably displaceable in longitudinal direction of the bridge by means of a drive means 15. The displacing means holds the individual tool carrier units in their basic positions at a predetermined distance $a$ from one another.

As shown in FIG. 2 and 3 the bridge 12 extends above a table 16 on which a glass plate 17 to be cut up is positioned. The bridge carries the first guide rail 11 provided for displaceably mounting the tool carrier units 10 onto it, as well as the second guide rail 18 for displaceably mounting the displacing means 14 onto it. In this embodiment the guide rails 11 and 18 are provided with prismatic guide grooves, and are connected with the frame 21 of the bridge by way of the spacers 19 and 20.

The tool carrier unit 10 comprises a carriage 22 having prismatic guide grooves 23, which communicate with the guide rail 11 of the bridge by way of the rolling elements 24. At the front side of the carriage 22 there is a vertically oriented guide 25, on which a cylinder 26 is fixedly mounted. The cylinder 26 comprises a guide sleeve 27 which can be pushed out by means of a pressure medium, in which guide sleeve 27 there is disposed a plunger 28 also actuatable by means of a pressure medium. A tool 29 is disposed at the lower end of the plunger 28, which tool, in the present case, is a glass cutting tool. A spacer roller 30 is fixedly mounted on the guide sleeve 27. The supply of the pressure medium to the cylinder is done by way of the conduit 31. The pressure medium may be pressurized air or a liquid under pressure.

The carriage 22 is connected with the displacing means 14 by way of a disengageable clutch 13. In the present example the clutch is a permanent magnet clutch and comprises a permanent magnet 34 connected with the displacing means 14 by way of a holding bracket 33, which permanent magnet 34 cooperates with a permanent magnet 35 disposed on carriage 22.

The tool carrier unit 10 is also provided with a stopping device 36. For this purpose, a friction element 37 is mounted on carriage 22, and is actuated by a pressure medium supplied by way of a conduit 38. Stopping is achieved by abutting the friction element 37 against the guide rail 11.

In the present case the displacing means 14 consists of a push rod 39, provided with the guide grooves 40 by means of which the push rod 39 is supported on guide rail 18 by way of the rolling elements 41. The guide rail 18 is also provided with prismatic guide grooves 42. The push rod 39 is provided with a cantilever bar 43 which connects onto the shaft 45 driven by a motor 46 by way of a threaded sleeve 44. In the present case the motor 46 is a stepping motor.

The present cutting apparatus is provided with an automatic control device, the block diagram of which is shown in FIG. 4. The control device comprises an input unit 47 which contains two rows of setting devices 48, each row containing at the most as many, but as a rule fewer setting devices than there are tool carrier units. It should be mentioned that these cutting devices are not rigidly assigned to each tool carrier unit, but are independent of these. The setting devices are actuated one after the other, the individual cutting distances being set on them, without regard to whether the tool carrier unit performing the cut has the same index number as the setting device, or not. Distances are set on the setting devices, for which purposes they may be provided with decimal keys or, as is the case in the present example, with counter wheels. The setting device $48_o$ serves for setting a zero-cut, i.e., a reference cut, whereas the setting devices $48_1$ to $48_n$ serve for continuously setting the momentary cutting distances between the individual cuts.

The input device 47 supplies its information on data to an operating control unit 49, in which the individual information is combined and transmitted in proper order to the other units. The operation control unit has a first counter 50 connected to it, which sums up elements of distance and adds up the cutting distances set on the setting devices. The operation control unit also has a second counter 51 connected to it, which in turn has a shift register 52 connected thereto. The first counter 50 and the second counter 51 are coupled to one another and run synchronously. The second counter serves for summing-up elements of distance until the distance $a$ between the tool carrier units, when in their basic positions, is reached. After the shift register 52 ran completely through the second counter 51, the former is shifted to the next storage register. With the exception of the tool carrier unit $10_o$, which serves for setting the zero-cut, each tool carrier unit $10_1$ to $10_n$ has a third counter 53, a selection unit 54 and a memory 55 assigned to it. The third counter serves for summing-up elements of distance, until the value $a$ corresponding to the distance between the tool carrier units 10 in their basic position, is reached. The arrangement is designed in such a way that the memory 55 can store information from the second counter 51 only if the tool carrier unit is connected with its assigned storage register of the shift register 52 by way of the selection unit 54 and, at the same time, the third counter has reached the end of a cutting distance. The operation control unit 49 also controls the motor 46, serving to drive the displacing or displacement means 14. This motor, which is a stepping motor, delivers pulses to the third counter 53 and causes it to continue switching in an amount proportional to the stepping pulses. As soon as the third counter has reached a value which corresponds to the pulse stored in memory 55, an additional pulse is emitted which serves for disconnecting the tool carrier unit from the displacing means.

As previously indicated, the control device comprises a unit for setting the zero-cut. For this purpose the input unit 47 is provided with a setting device $48_o$, which acts directly upon the motor 46 by way of the operation control unit 49, without any control being exerted on to the other tool carrier units $10_1$ to $10_n$. The operation control unit disconnects the tool carrier unit $10_o$ for the zero-cut directly at the zero point.

The mode of functioning of the cutting apparatus is described in the following, in more detail, with reference to FIG. 5. It is assumed that a glass plate 17 is to be cut into three strips having width values of 420 mm, 750 mm and 430 mm. Inasmuch as the glass plate has an irregular edge, it is required to first make a zero-cut, which will then be used as reference for setting the individual distances.

In the basic position of the cutting apparatus, the tool carrier units are located in their position G and must be displaced by an amount $x$ into the zero-position so that the zero-cut can be carried out. For this purpose, the setting device $48_0$ of the input unit 47 is set to the value $x$. The three cutting distances 420 mm, 750 mm and 430 mm may now be set on the setting devices $48_1$, $48_2$ and $48_3$, without having to wait for the displacement of the tool carrier units. After depression of a key not described in detail, the work program is carried out as described below.

The operation control device 49 first processes the zero-cut set on the setting device $48_0$. For this purpose the stepping motor 46 is moved as many steps as required to reach the distance x. The stepping motor displaces the displacing means 14, for example by 0.1 mm per switching step. After reaching the zero-position the stopping device 36 of the tool carrier unit $10_o$ is actuated by way of the operation control unit 49, so that the tool carrier unit $10_o$ is held fixed in its position. While setting the zero-cut or subsequent thereto, the tool carrier units required for carrying out the cuts are programmed. The cutting distances inputted into the setting devices $48_1$ to $48_3$ are transmitted to the first counter 50 and the second counter 51 by way of the operation control unit 49. Both counters continue counting until the total width of the three cutting distances is reached. Whereas the counter 50 adds the individual elements of distance until the total value is reached, the second counter 51 counts only until the basic distance $a$ between the tool carrier units is reached and then starts counting again from the beginning. In the present example, it is assumed that the basic distance between the individual tool carrier units amounts to 300 mm. Thus, after each 300 mm the second counter 51 begins to count again from the beginning, and shifts the shift register 52 by one storage register.

Since the first tool carrier unit cannot be set within the first 299 mm, the second counter switches the shift register to the first storage register only after the first completed pass, i.e., only after the first 299 mm, said first storage register being the one assigned to the first tool carrier unit $10_1$. Upon continually counting the cutting distances, the first and second counters establish the fact that a first cut is to be performed at a distance of 420 mm from the zero-cut. Since in this counting condition the second counter 51 is connected with the memory 55 of the first tool carrier unit $10_1$ by way of the shift register 52, the second counter 51 is able to input its count, namely 120 mm, into the memory 55 and thereby programs the first tool carrier unit $10_1$. The first and second counters 50 and 51 continue counting, and in doing so, after the end of the second completed pass, i.e. at 600 mm, the second counter connects the shift register to the tool carrier unit $10_2$ and continues its count. Inasmuch as there is no cut to be performed in the distance range between 600 and 900 mm, which distance range is assigned to the second tool carrier unit $10_2$, the memory 55 of this tool carrier unit $10_2$ is not programmed and after the second counter has reached 899 mm, it switches the shift register to the storage register assigned to the third tool carrier unit $10_3$. The first counter 50 establishes now the fact, that at 1,170 mm there is a second cut to be performed. Since at this instant the second counter 51 is connected with the memory 55 of the third tool carrier unit $10_3$ by way of the shift register 52, said memory is now programmed with the value indicated on the second counter 51, i.e., 270 mm. Since in the distance range assigned to the tool carrier unit $10_4$, there is no cut to be performed, the second counter completes its second pass without programming any of the memories. Since the last cut is located at 1,600 mm, i.e., in the distance range scanned by the tool carrier unit $10_5$, its memory is programmed with the count of the second counter 51. This counter 51 shows a value of $1,600 - (5 \times 300) = 100$ mm. Of the tool carrier units $10_1$ to $10_n$ only the units $10_1$, $10_3$ and $10_5$ are needed for performing the specified cutting task.

The other tool carrier units, not counting the tool carrier unit for the zero-cut, are not needed and consequently are not programmed. After the programming of the tool carrier units required for the cutting task has been completed, the performance of the cutting operation can ensue.

The setting of the tool carrier unit $10_o$ for the zero-cut may be done before, during or after the programming of the tool carrier units. The positioning of the tool carrier units assigned to perform the individual cuts is possible only after the programming of the tool carrier units and the positioning of the first tool carrier unit on the zero-cut line has been completed. If the setting of the tool carrier unit $10_o$ to the zero-cut position and the programming of the other tool carrier units have been accomplished in the manner described, then the motor 46 is put into motion by way of the operation control device 49 and simultaneously moves all tool carrier units $10_1$ to $10_n$ by way of the displacing means. The tool carrier unit $10_o$ assigned to perform the zero-cut has already been positioned and held in place by the stopping device 36. Inasmuch as the force holding the permanent magnets 34 and 35 of the disengageable clutch 13 together is smaller than the holding force of the stopping device 36 and the driving force of the motor 46, the permanent magnets 34 and 35 are separated from one another, i.e., the clutch is disengaged. The tool carrier unit $10_o$ thus remains stationary in its position. At the same time the motor 46 continues moving the remaining tool carrier units $10_1$ to $10_n$ by an amount corresponding to the basic distance $a$ between the tool carrier units. At the same time the motor 46 sends stepping pulses to the third counter 53 of all tool carrier units $10_1$ to $10_n$ and makes these count from 1 to 299. If one of the third counters 53 has reached a value corresponding to the value stored in its assigned memory 55, then an actuating signal is transmitted to the stopping device 36 of the associated tool carrier unit. The stopping device will subsequently be actuated to stop the tool carrier unit, its clutch 13 being disengaged in the manner described in connection with the tool carrier unit $10_o$ for the zero-cut. The motor 46 passes through its complete displacement range and positions all tool carrier units in the sequence of their individual distances from the reference position. In the present example the tool carrier units are positioned in this order, first the tool carrier unit $10_5$, then the tool carrier unit $10_1$, and finally the tool carrier unit $10_3$. After completion of the entire stroke of the displacing means, which may be set for example by means of limit switches, the motor 46 is stopped.

The operation control unit now actuates the individual tool carrier units and moves their tools into operating position. For this purpose the guide sleeves 27 are first moved forward, until the spacer rollers 30 are at the desired distance from the table 16. Then the tools 29 are moved forward by way of the plunger 28 and assume the required distance with respect to the spacer roller 30. The tool is now ready to cut the glass plate positioned underneath the bridge at the desired cutting distances. After completion of the cutting operation the operation control unit releases the braking devices 36 of the positioned tool carrier units, switches the motor 46 into reverse, erases the memory 55 and carries the tool carrier units into their basic position G. Upon return movement of the displacing means 14, the tool carrier units are automatically returned since the clutches are constructed in such a way that the clutch part 35 of the tool carrier unit lies in the displacement path of the clutch part 34 of the displacing means. The clutches engaged again by means of the permanently magnetic clutch parts 34 and 35. After completion of the return stroke of the displacing means all tool carrier units are again in their basic position and a new work cycle may be started.

The input unit 47 is preferably provided with a double set of setting devices 48, so that the distances relating to a subsequent cutting operation may be set during a present cutting operation. After completion of a cut the only step required is to switch over from one set of setting devices to the other, so that the control device may be immediately programmed and the working cycle performed. instead of the counting wheels and the corresponding multi-switches used in the present example as setting devices, decimal keys may be used which operate much faster. It is, furthermore, possible to use indicating devices with optical readout or printout to make the set distances visible and to keep them recorded.

The described and particularly preferred embodiment of a cutting apparatus has extraordinary advantages. First, there is only one single driving motor provided, which moves the individual tool carrier units together. The drive mechanism is not only simple, but also space saving and allows the maximum possible freedom of movement for the tool carrier units. Since it makes practically no difference to the driving mechanism and to the automatic control mechanism whether there are more or fewer tool carrier units provided, the number of tool carrier units may be optimally selected to suit the requirements at any given time.

In addition to the above described and especially preferred embodiment of the novel cutting apparatus, an entire series of further embodiments are possible.

Figure 6:
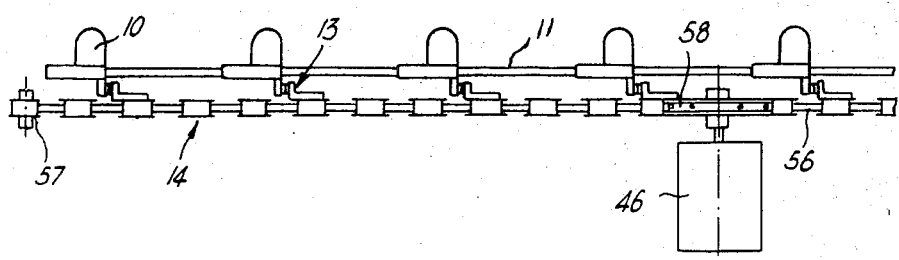
FIG. 6 shows a schematic view of a further embodiment of the cutting apparatus of FIG. 1.

In contrast to the described embodiment, the displacing means may be a chain 56, which is guided on both sides of the bridge over guide rollers 57, as shown in FIG. 6. A sprocket wheel 58 fixedly mounted onto the motor 46 may do the driving. The individual members of the chain carry parts of the clutches 13. The chain may be supported on guides so as to give it a straight line motion. Instead of the chain there could be provided a revolving rope or a toothed belt drive. It is also thinkable to provide in lieu of the revolving arrangement, the upper portion of a chain, a rope or a belt drive only, kept under tension by means of a tensioning device and returned in its original position.

A convenient solution consists in the use of a toothed rack as a displacing means, which could be driven by a motor provided with a transmission.

Although the described clutches constructed as permanent magnet clutches are particularly preferable, the use of other clutches is also possible. Regardless of the type of clutch used, it is particularly convenient to construct the clutches in such a way that upon return movement of the displacing means all tool carrier units are forcibly moved along. Detent clutches could be used for example, which can be disengaged by mechanical or electrical disengaging devices. Electromagnetic clutches which are easy to disengage electrically are also possible.

Figure 7:
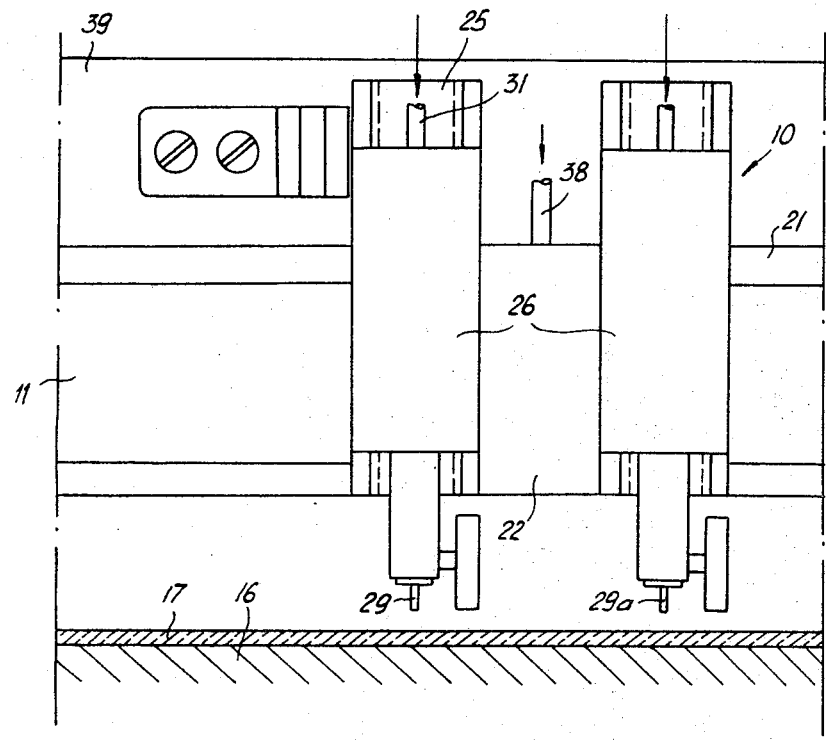
FIG. 7 shows another tool carrier unit carrying a primary and a secondary tool, in a view analogous to that of FIG. 3.

In some instances, it could be of advantage to equip the tool carrier unit 10 with a second tool 29a identical with the first tool 29 in regard to construction and mounting, as shown in FIG. 7. The first tool 29 then serves as primary tool, after the tool carrier units have been set into their individual cutting positions. The second tool serves as secondary or auxiliary tool and is mounted at a small fixed distance from the primary tool. The secondary tool is generally inoperative and is put to work in case a damaged section must be removed from a glass plate, to cut out the small section containing the defect. In such a case the primary tool performing the main cut must be set at the cutting distance plus the fixed distance between the primary and secondary tools 29 and 29a, the secondary tool 29a being actuated by a special triggering device not described in any more detail.

The present cutting apparatus may serve its purpose even if no device for setting the zero-cut is available, provided that it is ascertained that the material to be cut has at least one finished edge which may be used for abutment. In other instances the provision of a device for setting the zero-cut is recommended. Setting the zero-cut may be achieved by purely mechanical means, e.g., by displacing the bridge or preferably the displacing means by the amount of the zero-cut offset. For this purpose adjustable limit switches could be provided, for example, on the displacing means. Or, an adjustment mechanism could be provided between the displacing means and the drive means for displacing the displacing means with reference to the drive means. In the embodiment described with reference to FIGS. 1 to 5, there could be provided a tool carrier unit constructed and controlled as the other tool carrier units $10_1$ to $10_n$, to replace the special tool carrier unit $10_0$ for the zero-cut and its associated control unit. In this case the zero-cut offset distance would be inputed into the zero-cut setting device $48_0$ as a normal distance (see distance x for the zero-cut in FIG. 5).

The above described electronic control device has proved to be particularly simple and reliable. However, it is possible to solve the problem of the electronic control in other ways. Thus, the individual data may be inputed for example, by means of punched cards. Furthermore, there could be provided memories into which there could be inputed information relating to several cutting operations to be performed in sequence. Furthermore, there could be provided computers controlling several cutting apparatuses lined in in a row, in a known manner, whereby the cutting operations required to make a pattern are distributed to the several cutting apparatuses, some of which would perform cuts running perpendicular to the direction of the cuts performed by the others, thus making longitudinal and transverse cuts.

The apparatus according to the invention is particularly important for performing machining operations requiring frequently changing settings of the machining distances, which is the case when cutting glass plates to size. In such case there are provided in general at least two tools working perpendicularly to one another and alternately performing longitudinal and transverse cuts.

The apparatus is suited not only for glass plates, but also for cutting to size plates of other materials, such as ceramics, wood, plastic, etc. The apparatus may be also nsed for cutting up paper-, plastic- and textile sheets.

While there is shown and described present preferred embodiments of the invention, it is to be distinctly understood that the invention is not limited thereto but may be otherwise variously embodied and practiced within the scope of the following claims. Accordingly, I claim:

1. Apparatus with several tools for the simultaneous machining of a material moving with relative motion with respect to the tools, said apparatus to be used in particular for cutting a glass plate to size and comprising a support table for supporting the material and a bridge extending over said table and carrying several tool carrier units displaceable in longitudinal direction by power drive, characterized by the fact, that a drive means is provided to drive a displacing means transversely to the direction of machining, the individual tool carrier units being connected through disengageable clutches with said displacing means at preset distances from one another, said tool carrier units comprising stopping devices, the stopping devices serve as release mechanisms and are capable of developing a stopping force greater than the holding force of the clutches.

2. Apparatus with several tools for the simultaneous machining of a material moving with relative motion with respect to the tools, said apparatus to be used in particular for cutting a glass plate to size and comprising a support table for supporting the material and a bridge extending over said table and carrying several tool carrier units displaceable in longitudinal direction by power drive, characterized by the fact, that a drive means is provided to drive a displacing means transversely to the direction of machining, the individual tool carrier units being connected through disengageable clutches with said displacing means at preset distances from one another, further comprising an automatic control device for setting the tool carrier units to the desired machining distances, characterized by an input unit for inputting the machining distances;

an operation control unit connected to the input unit;

a first counter connected to the operation control unit for summing up elements of distance and adding up machining distances;

a second counter connected to the operation control unit and to the first counter and running synchronously with the latter, and serving the purpose of summing up elements of distance until the value of the distance between the tool carrier units is reached;

a shift register connected to the second counter, each of its storage registers being connected with one of the tool carrier units, and operating in such a way that after each complete pass of the second counter a shift to the next storage register takes place;

a third counter for summing-up elements of distance until the magnitude of the distance between the tool carrier units is reached and a memory for each tool carrier unit, said memory storing a pulse from the second counter if the associated storage register of the shift register is switched on and, at the same time, the first counter has reached the end of a machining distance;

a stepping motor for driving the displacing means, said motor being controlled by the operation control unit and connected with the third counter to drive the latter counter by means of step pulses proportional to the count setting, one of the tool carrier units being disconnected from the displacing means as soon as its stored pulse count is equal to the count set on the third counter.

3. Apparatus as claimed in claim 2, characterized in that the input unit comprises two sets of setting devices alternately connectable with the operation control device.

4. An apparatus equipped with several tools for the simultaneous machining of a material moving with relative motion with respect to the tools, especially for cutting a glass plate to size, comprising a support for supporting the material moving in a predetermined feed direction, a bridge mounted in spaced relation from said support, a number of tool carrier units carried by said bridge for displacement in longitudinal direction along the bridge, common displacement means for the tool carrier units, drive means for displacing said displacement means, disengageable clutches for operatively connecting the individual tool carrier units with said displacement means for displacing said tool carrier units along the bridge and setting said tool carrier units in desired position, said clutches being fixedly arranged at predetermined spacing from one another at said displacement means and during the adjustment of the tool carrier units all of the tool carrier units are conjointly displaced out of a starting position and each tool carrier unit is set at its displacement path where there should occur a machining operation.

5. The apparatus as defined in claim 4, wherein said clutches are arranged at said displacement means so as to possess substantially the same spacing from one another.

6. The apparatus as defined in claim 4, wherein said clutches are constructed such that upon displacement of the displacement means into the starting position all of the tool carrier units are entrained.

7. The apparatus as defined in claim 4, wherein said clutches comprise permanent magnetic clutches having interengaging components retained against one another by magnetic force and disengageable from one another by the application of a force having a magnitude greater than said magnetic force and a direction opposed to said magnetic force.

8. The apparatus as defined in claim 7, wherein the tool carrier units incorporate stopping devices capable of developing a stopping force greater than the holding force of the clutches.

9. The apparatus as defined in claim 4, further including means for adjusting a tool carrier unit for the performance of a reference machining operation serving as a reference magnitude.

10. The apparatus as defined in claim 5, further including means for adjusting a tool support unit for carrying out a reference machining operation serving as a reference magnitude, said reference machining-adjustment means comprising an adjustment device arranged between the drive means and the displacing means, said adjustment device serving to adjust the displacement means such that the reference machining-tool support unit can be brought into a reference machining position.

11. The apparatus as defined in claim 4, wherein each tool carrier unit carries a primary tool and a secondary tool, said secondary tool being located at a fixed distance from the primary tool and being actuatable independently therefrom.

12. The apparatus as defined in claim 9, comprising an automatic control device for setting the tool carrier units to the desired machining distances, characterized by an input unit for inputting the machining distances;

an operation control unit connected to the input unit;

a first counter connected to the operation control unit for summing up elements of distance and adding up machining distances;

a second counter connected to the operation control unit and to the first counter and running synchronously with the latter, and serving the purpose of summing up elements of distance until the value of the distance between the tool carrier units is reached;

a shift register connected to the second counter, each of its storage registers being connected with one of the tool carrier units, and operating in such a way that after each complete pass of the second counter a shift to the next storage register takes place;

a third counter for summing-up elements of distance until the magnitude of the distance between the tool carrier units is reached and a memory for each tool carrier unti, said memory storing a pulse from the second counter if the associated storage register of the shift register is switched on and, at the same time, the first counter has reached the end of a machining distance;

a stepping motor defining said drive means for driving the displacement means, said motor being controlled by the operation control unit and connected with the third counter to drive the latter counter by means of step pulses proportional to the count setting, one of the tool carrier units being disconnected from the displacement means as soon as its stored pulse count is equal to the count set on the third counter.

13. The apparatus as defined in claim 12, wherein the input unit embodies an input element for the reference machining-adjustment means, said input element acting via the operation control unit directly at the stepping motor, and said tool carrier unit for the performance of the reference machining operation by means of said adjusting means can be disconnected and actuated directly by the operating control unit via said adjusting means.

14. The apparatus as defined in claim 12, wherein the input unit comprises two sets of setting devices which are alternately connectable with the operation control device.

* * * * *